United States Patent
Sottke et al.

(10) Patent No.: US 7,326,461 B2
(45) Date of Patent: Feb. 5, 2008

(54) COMPOSITE MATERIAL

(75) Inventors: Volkmar Sottke, Mülheim (DE); Hartmut Westphal, Dermbach/Rhön (DE); Hendrikus Van Den Berg, Venlo-Blerick (NL)

(73) Assignee: Kennametal Widia GmbH & Co. KG, Essen (DE)

( * ) Notice: Subject to any disclaimer, the term of this patent is extended or adjusted under 35 U.S.C. 154(b) by 128 days.

(21) Appl. No.: 10/530,718

(22) PCT Filed: Sep. 26, 2003

(86) PCT No.: PCT/DE03/03228

§ 371 (c)(1),
(2), (4) Date: Apr. 5, 2005

(87) PCT Pub. No.: WO2004/033751

PCT Pub. Date: Apr. 22, 2004

(65) Prior Publication Data

US 2005/0260432 A1     Nov. 24, 2005

(30) Foreign Application Priority Data

Oct. 7, 2002   (DE) ................. 102 46 635
Nov. 5, 2002   (DE) ................. 102 51 404

(51) Int. Cl.
    *B23B 27/14*     (2006.01)

(52) U.S. Cl. ............ 428/216; 428/336; 428/698; 428/701; 428/702

(58) Field of Classification Search ........ 428/701, 428/702, 698, 216, 336
    See application file for complete search history.

(56) References Cited

U.S. PATENT DOCUMENTS

| 3,836,392 | A | * | 9/1974 | Lux et al. ............ 428/472 |
| 4,180,400 | A | * | 12/1979 | Smith et al. .......... 428/469 |
| 4,701,384 | A | * | 10/1987 | Sarin et al. .......... 428/701 |
| 4,702,970 | A | * | 10/1987 | Sarin et al. .......... 428/698 |
| 4,746,563 | A | | 5/1988 | Nakano ............... 428/216 |
| 5,137,774 | A | * | 8/1992 | Ruppi ................. 428/216 |
| 5,674,564 | A | | 10/1997 | Ljungberg ............ 427/255 |
| 5,827,570 | A | * | 10/1998 | Russell ............. 427/255.34 |
| 5,985,427 | A | | 11/1999 | Ueda ................. 428/216 |
| 6,632,514 | B1 | * | 10/2003 | Sulin et al. .......... 428/216 |
| 6,660,371 | B1 | * | 12/2003 | Westphal et al. ........ 428/216 |

* cited by examiner

*Primary Examiner*—Archene Turner
(74) *Attorney, Agent, or Firm*—Andrew Wilford

(57) ABSTRACT

A composite material has a base substrate body with first and second coatings. Each coating is formed by a multiphase layer of titanium oxide and at least two oxides from the group of aluminum, zirconium, and hafnium oxide and a second single-phase layer on the first layer consisting of only one oxide of aluminum, zirconium, and hafnium.

9 Claims, 3 Drawing Sheets

US 7,326,461 B2

COMPOSITE MATERIAL

CROSS REFERENCE TO RELATED APPLICATIONS

This application is the U.S. national phase of PCT application PCT/DE2003/003228 filed 26 September 2003 with a claim to the priority of German patent application 1024665.1 itself filed 7 Oct. 2002 and German patent application 10251404.6 itself filed 5 Nov. 2002.

FIELD OF THE INVENTION

The invention relates to a composite material of a base body with a multi-layer coating. Such composite bodies are, for example, used as cutting inserts for machining purposes, namely, turning, milling or boring. The base bodies, to which the coating can be applied by physical or chemical vapor deposition processes. (PVD or CVD), can be composed of hard metal, a cermet, steel or a ceramic.

BACKGROUND OF THE INVENTION

DE 27 36 982 A1 already describes a wear resistant coating for shaped parts, especially for tools, comprised of a shaped body, preferably of hard metal, and one or more surface coatings, at least one of which is a protective layer with a ceramic matrix into which a further material is incorporated. The ceramic matrix and the material incorporated therein have different coefficients of thermal expansion so that the protective layer is subject to the formation of fine microcracks therein. Unstabilized and/or partially stabilized ZrO2 has been proposed as the material incorporated into the interstices of a ceramic matrix of $Al_2O_3$. To produce such a layer by the CVD process, $AlCl_3$, $CO_2$ and $H_2$ are admitted as a gas phase into a reaction vessel at 1100° C. to produce $Al_2O_3$ or $ZrCl_4$ and water vapor ($H_2O$) are admitted to produce $ZrO_2$. Because of the density difference between the tetragonal modification of $ZrO_2$ formed at temperatures above the transformation temperature of about 1100° C. and the monoclinic modification formed below about 1100° C., with a corresponding phase conversion there can be a significant change in volume of the deposited $ZrO_2$. As a consequence, with increasing volume proportions of the $ZrO_2$ there is a simultaneous increase in the microcrack density in the deposited ceramic layer.

In DE 28 25 009 C2 (U.S. U.S. Pat. No. 4,180,400), a hard metal body with a thin wear-resistant surface layer of $Al_2O_3$ has been described and which is composed completely or at least 85% of the κ-modification and any possible remainder of the α-modification, forming surface regions or patches at most 10 µm in size. The aluminum oxide layer can contain further additions of titanium, zirconium and/or hafnium. To create this ceramic layer by the CVD process, the gas mixture apart from $AlC_3$, $CO_2$, CO and $H_2$ has also small amounts of 0.03 to 0.5% $TiCl_4$ added to it. This addition, however, serves exclusively or nearly exclusively for the formation of the κ-$Al_2O_3$ phase.

A further CVD process for depositing $Al_2O_3$ and/or $ZrO_2$ using additional reagents, like hydrogen sulfide, has been described in EP 0 523 021 B1 (U.S. Pat. No. 5,674,564).

DE 195 18 927 A1 (U.S. Pat. No. 5,827,570) describes a coated cutting tool comprised of a substrate of sintered carbide or ceramic with a wear-resistant composite ceramic coating which has two different metal oxide phases, for example of $Al_2O_3$ and $ZrO_2$ and in addition thereto a doping agent selected from the group of sulfur, selenium, tellurium, phosphorus, arsenic, antimony, bismuth or compounds of these elements. To produce this two-phase layer by a CVD process, for example $AlCl_3$ and $ZrCl_4$, $CO_2$ with $H_2$ as a carrier gas, in addition to an $H_2S$ gas, is passed over the substrate body at a temperature of about 700° to 1250° C. and a pressure from 133 Pa to ambient pressure, whereby the two-phase layer with the doping agent is deposited.

EP 0 786 536 A1 (U.S. Pat. No. 5,985,427) describes a coated hard metal body with a 3 to 30 µm thick aluminum oxide coating which has been deposited by means of CVD and/or PVD and contains 0.005 to 0.5 weight % chlorine. Optionally 0.5 to 10 weight % Zr and/or Hf and 1.5 to 15 weight % Ti can be contained in this coating.

EP 0 162 656 A2 (U.S. Pat. No. 4,746,563) describes a multilayer coating on a hard metal substrate body which is comprised of an inner layer, which is composed of at least one carbide, nitride, carbonitride, carbo-oxygen nitride, oxynitride, boron nitride or boron-carbonitride of titanium, and an outer multilayer coating with a total thickness of 5 to 20 µm and provided with an outer layer of a plurality of $Al_2O_3$ coatings with a respective thickness of 0.01 to 2 µm and each comprised of an $Al_2O_3$ film in which titanium oxide has been dissolved or which has been codeposited with at least 30 volume percent titanium oxide. The layers are separated by intervening layers with respective thicknesses of 0.01 to 2 µm and which each can comprise TiC, TiN, TiCN, TiCNO, TiNO, titanium oxides, Ti(B,N), Ti(B,N,C), SiC, AlN or AlON.

In WO 00/17 416 (U.S. Pat. No. 6,660,371), a composite material of a coated hard metal or cermet base body has been described on which the single layer or a multilayer coating is applied at least in the form of a 0.5 µm to 25 µm thick coating and preferably the outermost phase is an $Al_2O_3$ phase containing a $ZrO_2$ and/or $HfO_2$ phase which in turn contains a third fine dispersive phase consisting of an oxide, oxycarbide, oxynitride or oxycarbonitride of titanium. The proportion of the third phase in the overall composition of this layer amounts to 0.2 to 5 mol %. To produce such a three phase layer, a CVD process with deposition temperatures between 900° C. and 1000° C. is selected in which the gases required for the deposit contain chlorides of the Al, Zr and Hf, and in addition $CO_2$, $H_2$, $CH_4$ and $N_2$ or inert gas under pressures of 10 to 100,000 Pa. The $TiO_x$ incorporated as the third phase has a positive effect on the growth speed and on the particle sizes of the aluminum oxide and zirconium or hafnium oxide. Preferably a coating temperature of 960° C. is selected in which the $ZrO_2$ is present in the monoclinic form. From the mentioned publication, therefore, hard metal substrate bodies are known which have layer sequences TiN—Ti(C,N) and the described three phase layer.

OBJECT OF THE INVENTION

It is the object of the present invention to provide a composite body which, when used as a cutting insert, affords increased cutting affectivity as well as a longer useful life. Higher cutting effectiveness is determined in terms of the desired high cutting speeds and increased thicknesses of the chip removed. If possible such cutting inserts should be usable in so-called dry cutting operations.

SUMMARY OF THE INVENTION

These objects are attained with a composite material having a base body carrying at least one multiphase coating of the oxides of aluminum, zirconium and/or hafnium and of titanium (as a three phase coating) and a single-phase layer or coating of $Al_2O_3$, $ZrO_2$ or $HfO_2$. In the coating on the base body, therefore, there is, both at least one mutiphase oxide layer as well as at least one single-phase oxide layer. The multiphase layer can, apart from the three-mentioned oxide components, contain MgO and the single-phase layer can additionally contain up to 1% of a titanium oxide proportion. According to a further feature of the invention, however, at least two and preferably at least three layers are, provided of which each is comprised of the mentioned multiphase layer of the oxides of Al, Zr, Ti and/or Al, Hf, Ti and/or Al, Zr, Ti, Mg and/or Al, Hf, Ti, Mg, and a single-phase oxide layer of an oxide of Hf, Zr or Al. Preferably at least three-phase or four-phase oxide layers are provided between which respective single-phase oxide layers are disposed and whereby a single-phase oxide layer also forms the outer cover coating. These layers have a fine grained lattice structure and a uniform phase distribution and provide a high degree of thermal insulation. The base body can also be comprised of a hard metal, a cermet, or steel or a ceramic material.

Between the substrate body and the first oxide layer which preferably is a multiphase oxide layer is at least one layer of a carbonitride of titanium, hafnium, zirconium. This cover layer can have a thickness between 2 to 15 μm, especially 3 to 8 mm.

According to a further feature of the invention it is possible to provide, between the multiphase oxide layer and the single-phase oxide layer, preferably in a multi layer sequence of the multiphase oxide layers and single-phase oxide layers between each of the mentioned layers, one or more intermediate layers of titanium, hafnium or zirconium carbonitride.

These intervening layers have preferably a thickness between 0.2 and 3 μm, especially of 2 μm.

The total thickness of all multiphase oxide layers and all single-phase oxide layers preferably lies between 6 and 20 μm especially at 10 μm. The difference of a single-phase oxide layer can amount to 2 to 6 μm preferably 4 μm and the thickness of an individual single-phase oxide layer can amount to 1 to 5 μm preferably 3 μm.

The multiphase coating is produced by a CVD process which is basically known from WO 00/17 416 or as the so-called middle temperature. CVD process.

In a further embodiment of the invention, to eliminate tensile stresses or to increase compressive stresses in the composite body, the composite body can be subjected to a treatment with a blasting agent, the blasting agent being preferably composed composed of a hard metal granulate which can have a substantially rounded grain configuration and a maximum grain diameter of 200 μm and more preferably of a maximum of 100 μm.

BRIEF DESCRIPTION OF THE DRAWING

Further advantages of the invention are described in connection with an exemplary embodiment. The drawing shows.

SPECIFIC DESCRIPTION

The test objects were in all three cases cutting inserts of the type CNMG120412-5. In all three cases the substrate: body:

was a hard metal (THM) but the coatings were different in the three cases. In a first test series the work press was gray cast iron with a cutting speed of 450 m/min and a cutting depth of: 2. 5 mm and an advance of the cutting insert of 0.315 mm per revolution. The first cutting body was comprised of a hard metal base body coated with a two layer coating of TiCN—$Al_2O_3$ (as an outer layer). The life achieved was less than 2 min. A significantly improved life was given with a two layer coating in which on a TiCN— cover layer a three phase oxide layer according to WO 00/17 416 was applied comprised of $Al_2O_3/ZrO_2/TiO_x$.

A clear improvement in the useful life still further can however be achieved with a cutting insert which had a TiCN adjacent the substrate body and a six layer outer coating which was comprised of three individual layers each of a three phase oxide coating and a single-phase $ZrO_2$ layer.

In a second test a gray cast iron workpiece with an extremely rough surface is machined by turning whereby in comparison to the previously described test only the cutting speed was reduced to 200 m/min. Based upon this cutting speed, there was obtained a useful life of 6 min for the cutting inserts with a TiCN—$Al_2O_3$ coating, of about 7 min for cutting inserts with a TiCN—$Al_2O_3/ZrO_2/TiO_x$ coating, and a useful life of 9 min for a cutting insert with the coating of the invention in which by contrast with the previously described versions had a three times alteration of a three-phase oxide layer of $Al_2O_3/HfO_2/TiO_x$ and the single-phase oxide layer of $HfO_2$. The above described cutting tests were carried out with so-called dry cutting.

Figure 1:
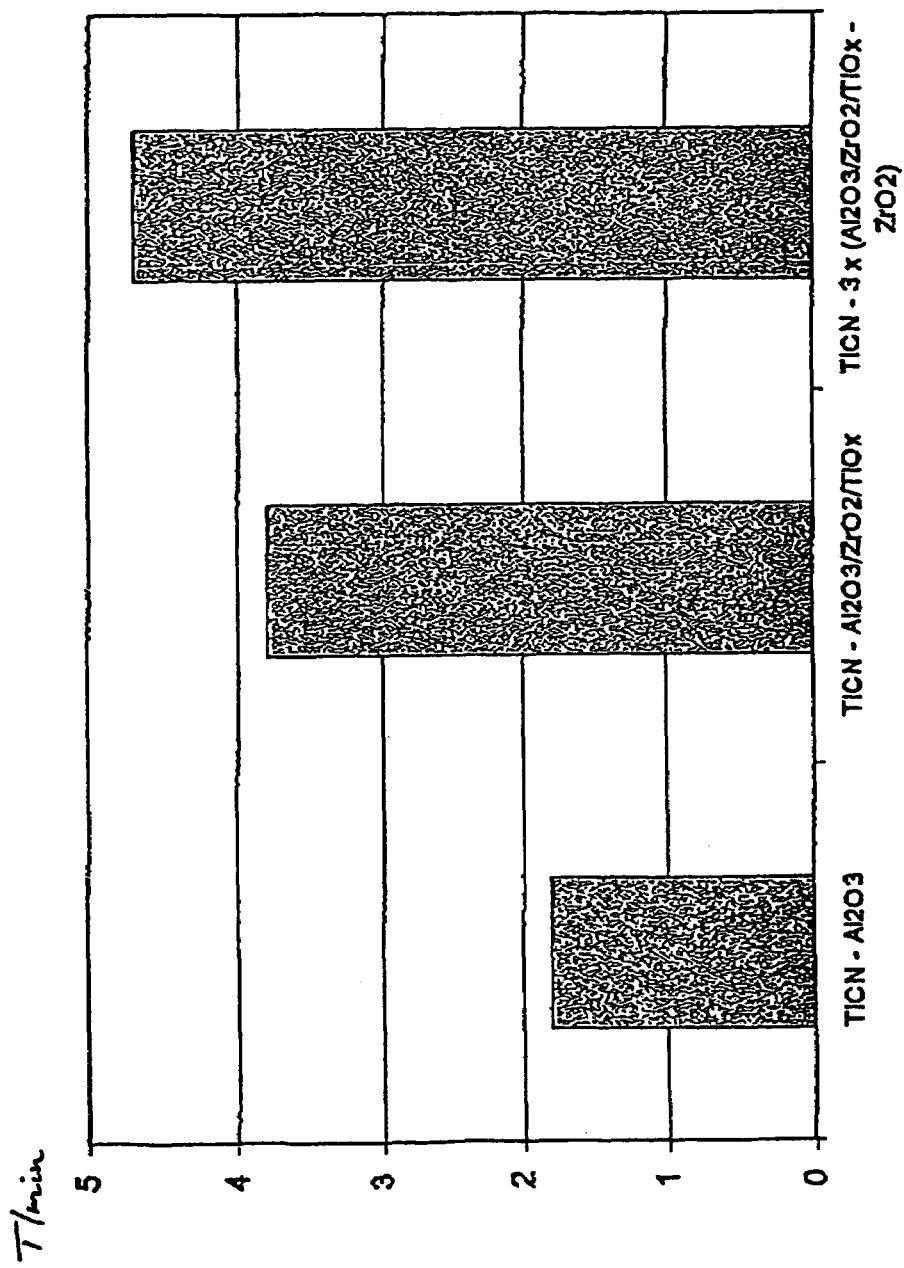
FIGS. 1 to 3 respective diagrams which provide information with respect to the improved life of the composite material according to the invention in cutting inserts by comparison with the state of the art.
Figure 2:
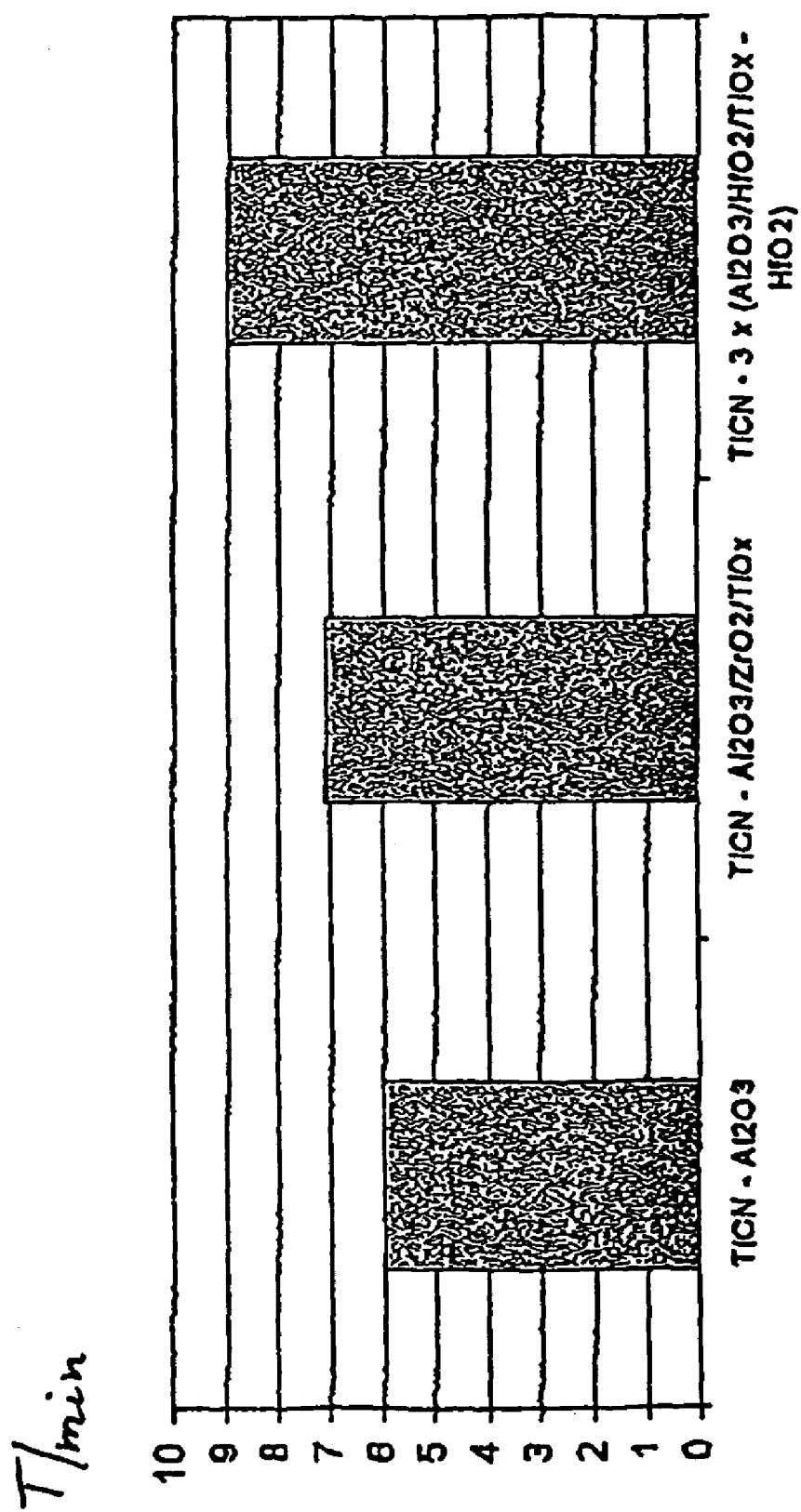
Figure 3:
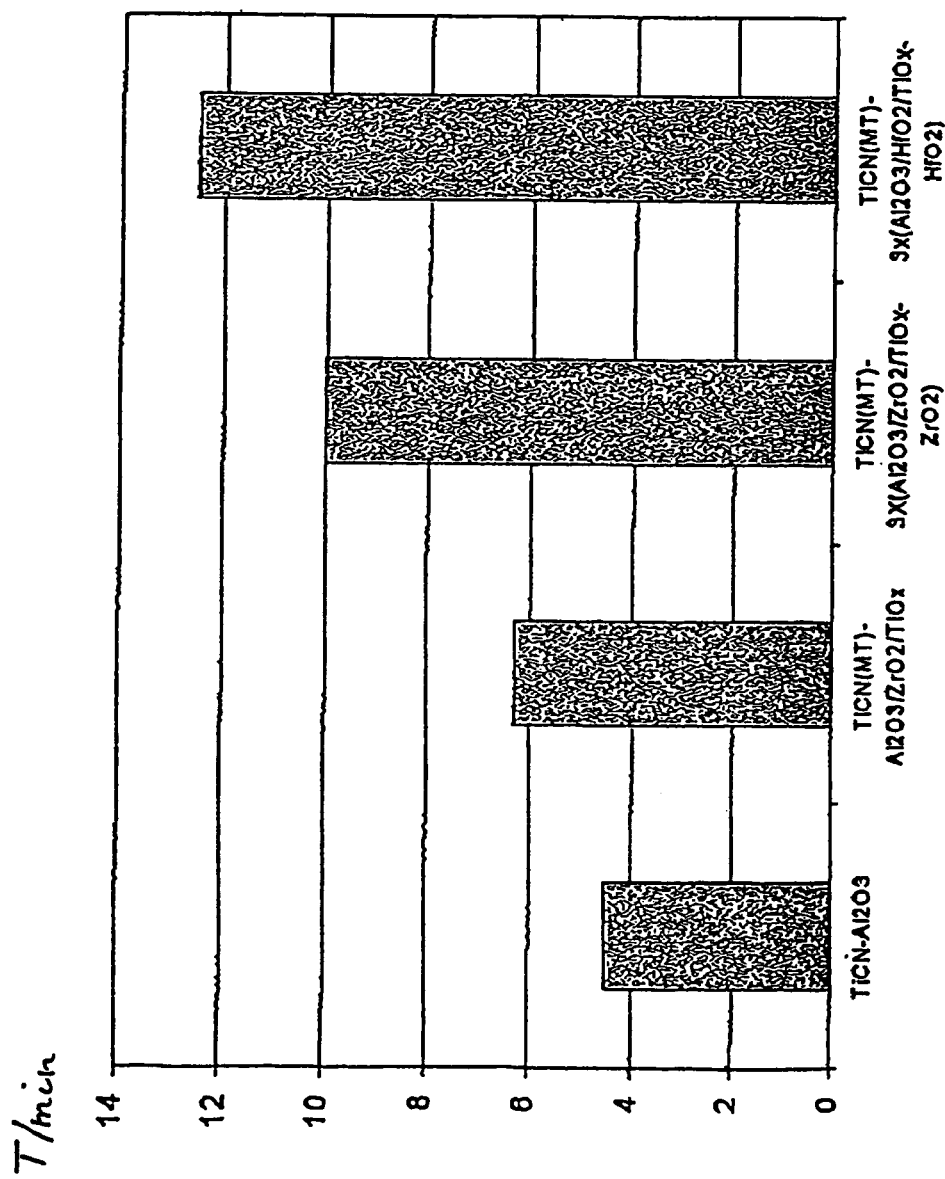

As FIG. 3 shows, however, with use of a lubricant coolant, still higher useful lives can be obtained. In the lathe turning of is grey cast iron at cutting speeds of 450 m/min, a cutting depth of 2.5 mm, and a feed of 0.315 mm per revolution, the useful life of the cutting insert with a TiCN—$Al_2O_3$ cutting amounted to about 4.5, min, the useful life of a cutting insert with a coating according to WO 00/17 416 was about 6.5 min, whereas the coating according to the invention resulted in useful lives of 10 or 12.5 min. Especially when $HfO_2$ forms the single-phase oxide layers, it is possible to obtain a still more substantial increase in the useful life by comparison with the already improved life using $ZrO_2$ as the single-phase oxide layer. All coatings were applied by the so-called CVD-MT (middle temperature) process under the same process conditions.

The invention claimed is:

1. A composite material comprised of:
a base substrate body;
a first coating on the base body of a multiphase layer of titanium oxide and at least two oxides from the group of aluminum, zirconium, and hafnium oxide and a second single-phase layer on the first layer consisting of only one oxide of aluminum, zirconium, and hafnium; and
a second coating on the first coating of a multiphase layer of titanium oxide and at least two oxides from the group of aluminum, zirconium, and hafnium oxide and a second single-phase layer on the respective first layer consisting of only one oxide of aluminum, zirconium, and hafnium.

2. A composite material according to claim 1 wherein each multiphase layer contains an additional proportion of MgO or each single phase layer contains up to 1% of an additional titanium oxide.

3. The composite material according to claim 1 wherein the base body is composed of a hard metal, steel, cermet or ceramic.

4. The composite material according to claim 1 wherein between the substrate body and the first multiphase oxide layer, at least one layer of TiCN, HfCN or ZrCN is provided which has a thickness of 1 to 15 μm.

5. The composite material according to claim 1 wherein between each multiphase oxide layer and the respective single-phase oxide layer, one or more intermediate layers are provided of TiCN, HfCN, or ZrCN, each of which has a thickness between 0.2 μm to 3 μm.

6. The composite material according to claim 1 wherein the total thickness of all of the multiphase oxide layers and all single phase oxide layers is 6 to 20 μm, the thickness of an individual multiphase oxide layer being 2 to 6 μm, or the thickness of the individual single phase oxide layer being 1 to 5 μm.

7. The composite material according to claim 1 wherein the multilayer coating is produced by means of CVD.

8. The composite material according to claim 1 wherein the composite material is subjected to a final dry blast treatment using a granular blast agent composed of a high metal granulate and which at least in major part has a rounded grain configuration with a maximum diameter of 150 μm.

9. The composite material defined in claim 1, further comprising:

a third coating on the second coating of a multiphase layer of titanium oxide and at least two oxides from the group of aluminum, zirconium, and hafnium oxide and a second single-phase layer on the respective first layer consisting of only one oxide of aluminum, zirconium, and hafnium.

* * * * *